(12) United States Patent
Gudivada et al.

(10) Patent No.: US 11,382,057 B2
(45) Date of Patent: Jul. 5, 2022

(54) UE OPTIMIZATION TO MOVE BETWEEN WIRELESS COMMUNICATION NETWORKS BASED ON SUCI SUPPORT

(71) Applicant: QUALCOMM Incorporated, San Diego, CA (US)

(72) Inventors: Naga Chandan Babu Gudivada, Hyderabad (IN); Sharda Ranjan, Hyderabad (IN); Somashekar Reddy Pinnapureddy, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 24 days.

(21) Appl. No.: 16/938,431

(22) Filed: Jul. 24, 2020

(65) Prior Publication Data
US 2021/0345284 A1    Nov. 4, 2021

(30) Foreign Application Priority Data

May 1, 2020    (IN) .............................. 202041018672

(51) Int. Cl.
| | |
|---|---|
| *H04W 60/00* | (2009.01) |
| *H04W 60/04* | (2009.01) |
| *H04W 8/20* | (2009.01) |
| *H04W 8/18* | (2009.01) |
| *H04W 76/11* | (2018.01) |

(52) U.S. Cl.
CPC ........... *H04W 60/04* (2013.01); *H04W 8/183* (2013.01); *H04W 8/205* (2013.01); *H04W 60/005* (2013.01); *H04W 76/11* (2018.02)

(58) Field of Classification Search
CPC ... H04W 60/04; H04W 60/005; H04W 8/205; H04W 76/11; H04W 8/183
See application file for complete search history.

(56) References Cited

U.S. PATENT DOCUMENTS

| 8,943,321 B2 | 1/2015 | Holtmanns et al. |
| 9,565,547 B2 | 2/2017 | Manalo et al. |
| 10,425,817 B2 | 9/2019 | Torvinen et al. |
| (Continued) | | |

FOREIGN PATENT DOCUMENTS

| WO | WO-2019047197 A1 | 3/2019 |
| WO | WO-2019221493 A1 | 11/2019 |
| WO | WO-2020009659 A1 | 1/2020 |

OTHER PUBLICATIONS

5G Americas Whitepaper, The Evolution of Security in 5G (Year: 2018).*

*Primary Examiner* — Said M Elnoubi
(74) *Attorney, Agent, or Firm* — Norton Rose Fulbright US LLP

(57) ABSTRACT

Wireless communication techniques that include network service discovery and selection techniques in wireless communication systems are discussed. A UE may trigger a first subscription concealed identifier (SUCI) calculation associated with a first registration procedure. The first registration procedure may be used to register the UE in a first wireless communication network associated with a first radio access technology (RAT). The UE may also trigger a second registration procedure to register the UE in a second wireless communication network associated with a second RAT upon detecting a first failure instance of the first SUCI calculation. Other features are also described.

24 Claims, 7 Drawing Sheets

(56) References Cited

U.S. PATENT DOCUMENTS

| | | | |
|---|---|---|---|
| 10,827,422 B1* | 11/2020 | Xu | H04W 48/18 |
| 2017/0048855 A1 | 2/2017 | Garg et al. | |
| 2018/0063774 A1 | 3/2018 | Gupta et al. | |
| 2019/0223017 A1 | 7/2019 | Lai et al. | |
| 2019/0246267 A1 | 8/2019 | Nakarmi et al. | |
| 2020/0029269 A1* | 1/2020 | Jia | H04W 76/18 |
| 2020/0267544 A1* | 8/2020 | Nakarmi | H04W 8/20 |

* cited by examiner

UE OPTIMIZATION TO MOVE BETWEEN WIRELESS COMMUNICATION NETWORKS BASED ON SUCI SUPPORT

CROSS-REFERENCE TO RELATED APPLICATIONS

This application claims the benefit of and priority to Indian Patent Application No. 202041018672, entitled, "UE OPTIMIZATION TO MOVE BETWEEN WIRELESS COMMUNICATION NETWORKS BASED ON SUCI SUPPORT," filed on May 1, 2020, which is expressly incorporated by reference herein in its entirety.

TECHNICAL FIELD

Aspects of the present disclosure relate generally to wireless communication systems, and more particularly, to network service discovery and selection techniques in wireless communication systems (e.g., to aid a mobile device in obtaining network service). Certain embodiments of the technology discussed below can enable and provide enhanced communication features and techniques for communication systems, including aiding devices to discover, select, and use network service, high performance, high reliability, low latency, low complexity, and power-efficient device operations.

INTRODUCTION

Wireless communication networks are widely deployed to provide various communication services such as voice, video, packet data, messaging, broadcast, and the like. Wireless networks may be multiple-access networks capable of supporting multiple users by sharing available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include triggering, by a user equipment (UE), a first subscription concealed identifier (SUCI) calculation associated with a first registration procedure. The first registration procedure may be used to register the UE in a first wireless communication network associated with a first radio access technology (RAT). The method can also include triggering, by the UE, a second registration procedure to register the UE in a second wireless communication network associated with a second RAT upon detecting a first failure instance of the first SUCI calculation.

In another aspect of the disclosure, an apparatus configured for wireless communication is provided. For example, the apparatus can include means for triggering a first SUCI calculation associated with a first registration procedure. The first registration procedure may be used to register a UE in a first wireless communication network associated with a first RAT. The apparatus can also include means for triggering a second registration procedure to register the UE in a second wireless communication network associated with a second RAT upon detecting a first failure instance of the first SUCI calculation.

In an additional aspect of the disclosure, a non-transitory computer-readable medium having program code recorded thereon is provided. The program code can include program code executable by a computer for causing the computer to trigger a first SUCI calculation associated with a first registration procedure. The first registration procedure may be used to register a UE in a first wireless communication network associated with a first RAT. The program code can also include program code executable by a computer for causing the computer to trigger a second registration procedure to register the UE in a second wireless communication network associated with a second RAT upon detecting a first failure instance of the first SUCI calculation.

In another aspect of the disclosure, an apparatus configured for wireless communication is provided. The apparatus includes at least one processor, and a memory coupled to the processor. The at least one processor can be configured to trigger a first SUCI calculation associated with a first registration procedure. The first registration procedure may be used to register a UE in a first wireless communication network associated with a first RAT. The at least one processor can also be configured to trigger a second registration procedure to register the UE in a second wireless communication network associated with a second RAT upon detecting a first failure instance of the first SUCI calculation.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
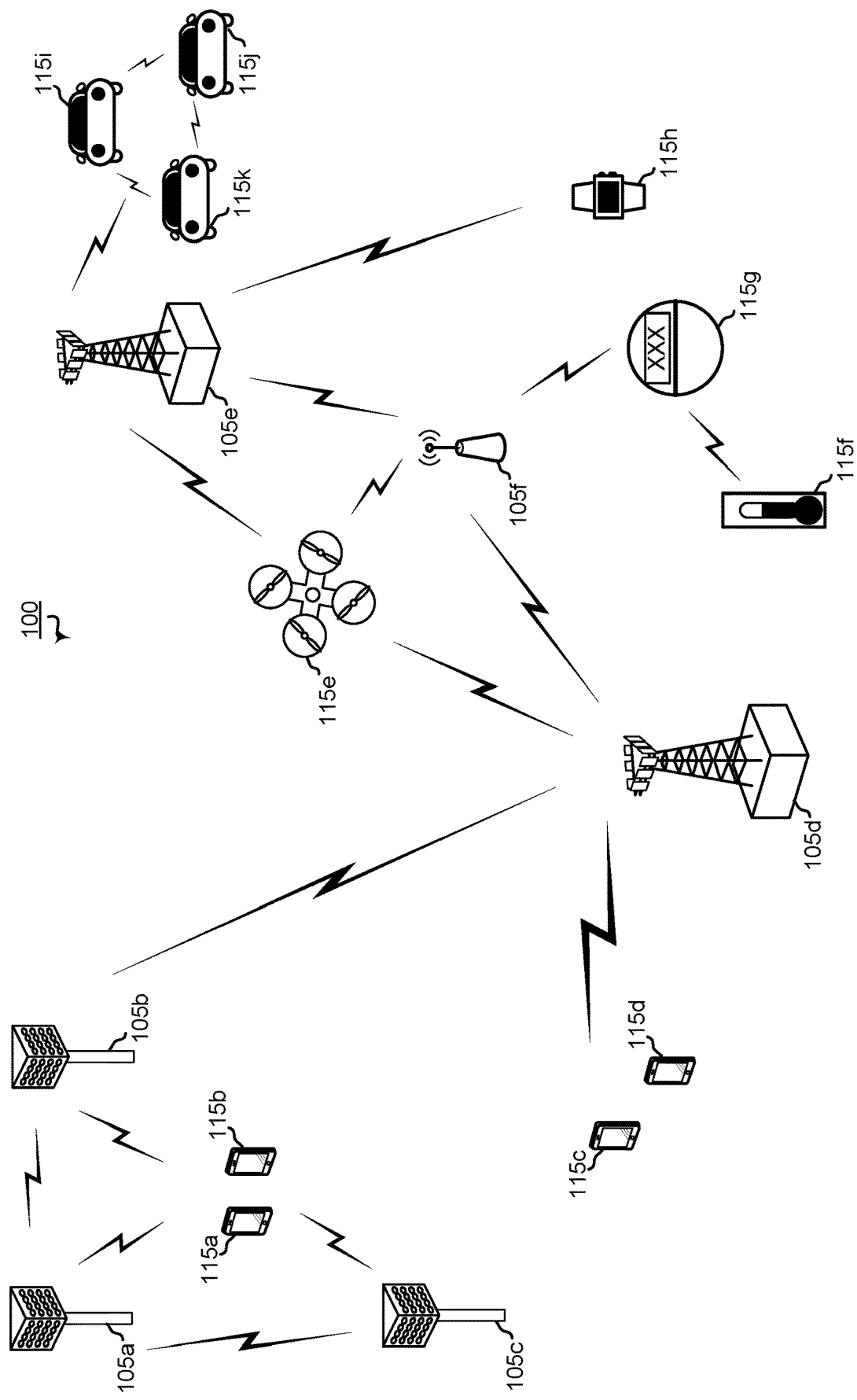
FIG. 1 is a block diagram illustrating details of a wireless communication system according to some aspects of the present disclosure.

The detailed description set forth below is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

As mentioned, this disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. A 5G NR system may be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations. In this fashion networks may employ varying usage of a variety of timing/frequency arrangements.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
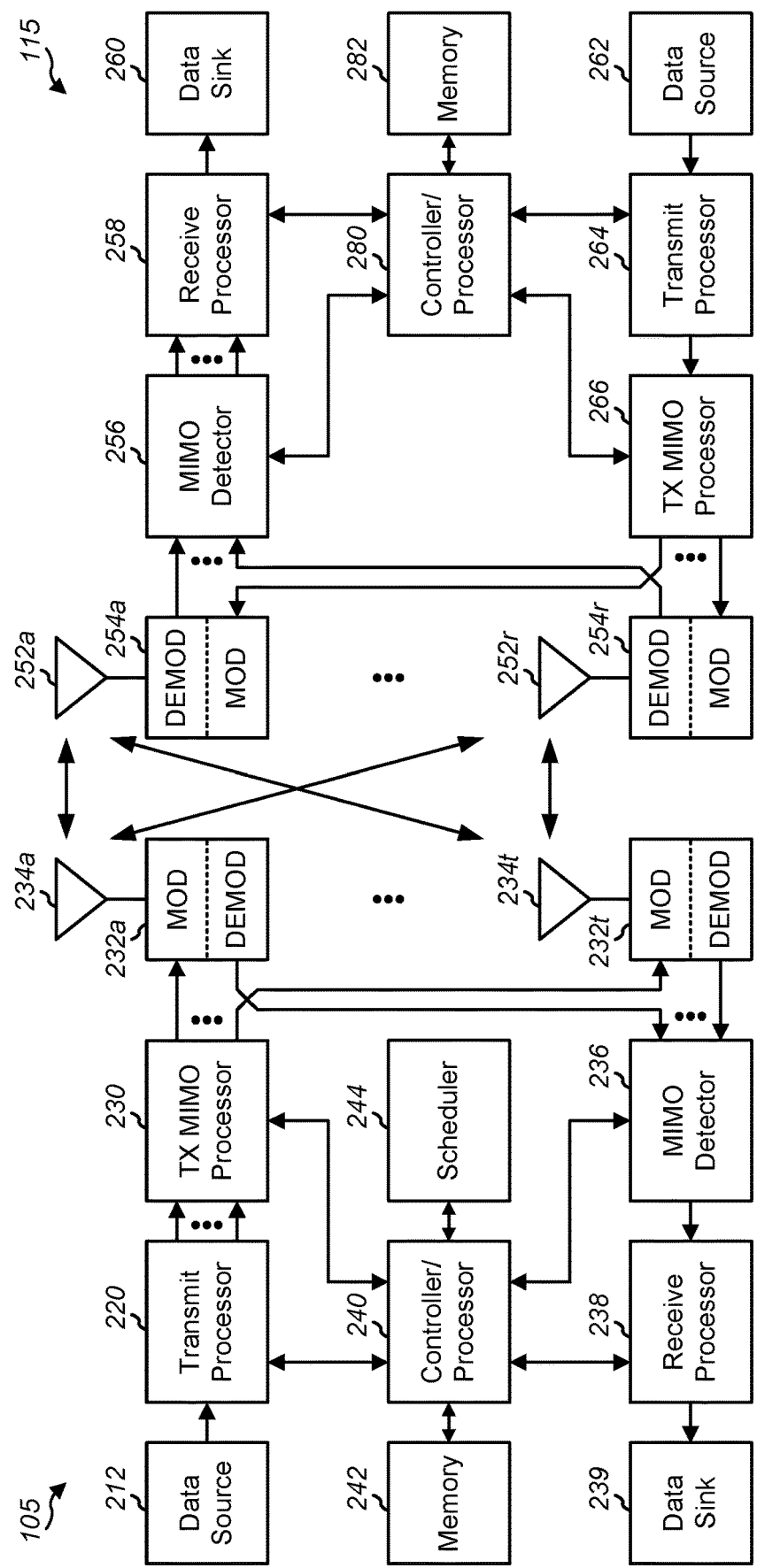
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 4, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band. The shared RF spectrum band can include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negativeacknowledge (ACK/NACK) feedback for its own transmitted packets as a proxy for collisions.

A UE, such as UE 115, may obtain wireless network service from various wireless communication networks using various types of radio access technology (RAT). A UE may use a RAT priority list to aid its selection of a wireless network from which to attempt to obtain network service. In some aspects, a RAT priority list may refer to a list that specifies an order or priority of RATs to use for wireless communication. A UE may attempt to obtain network service using a RAT selected in accordance with the order of priority set forth in the RAT priority list. For example, a UE may initially attempt to register for service in a wireless network associated with a RAT having the highest priority ranking in a RAT priority list.

Of the various wireless communication RATs commercially available throughout the world, 5G NR technology exhibits many improvements. These improvements may be seen in some scenarios relative to non-5G NR technology as well as technology that is a mixture of 5G NR technology and non-5G NR technology. In some aspects, a RAT that includes only 5G NR technology may be referred to as a RAT that operates in a standalone (SA) mode of 5G NR. Such a RAT may be referred to as 5G (SA) or 5G stand alone. According to some aspects, a RAT that includes a mixture of 5G NR technology and non-5G NR technology, such as 4G or a particular type of LTE technology, may be referred to as a RAT that operates in a non-standalone (NSA) mode of 5G NR. Such a RAT may be referred to as 5G (NSA) or 5G non-stand alone. In some aspects, non-5G NR technology may refer to any technology that does not include 5G NR. For example, non-5G technology may include LTE (or a particular type of LTE, such as LTE Advanced (LTE-A), LTE in unlicensed spectrum (LTE-U), etc.), 4G, WCDMA, CDMA2000, GSM, TD-SCDMA, IS-95, to name only a few.

Certain embodiments and deployments may use a priority list to help prioritize network access among several networks. A RAT priority list may guide a UE's selection of a wireless network from which to request network service. For example, when 5G (SA) is the highest priority RAT in a RAT priority list, a UE associated with that RAT priority list may attempt to register for network services on a wireless network associated with 5G (SA) when network service is needed. If registration and authentication of a UE for network service on the 5G (SA) network fails, the UE may attempt to register and authenticate itself for service on a wireless network associated with the next highest priority RAT in the RAT priority list. In some aspects, a next highest priority RAT may be a different RAT, such as a 5G (NSA) RAT or a non-5G RAT.

Transitioning from one RAT to another can present network access and timing challenges. Prior techniques for transitioning from a registration procedure attempting to register/authenticate a UE for service on a 5G (SA) network to a registration procedure attempting to register/authenticate the UE for service on a non-5G (SA) network yield unfavorable operations in some instances. For example, prior techniques cause a UE to repeatedly attempt to register for service on a 5G (SA) network many times before finally declaring that 5G (SA) service cannot be achieved and transitioning to attempting to register the UE for service on a non-5G (SA) network. Time lapse due to RAT transitions and repeated registration attempts can result in poor user experience and inefficient device operation.

One operation of a 5G (SA) network registration/authentication procedure that may cause the 5G (SA) network registration/authentication procedure to be unnecessarily repeated many times may be a subscription concealed identifier (SUCI) calculation. Repeated SUCI calculation failures may cause a 5G (SA) network registration/authentication procedure to be unnecessarily repeated before finally declaring that 5G (SA) service cannot be achieved and transitioning to attempting to register the UE for service on a non-5G (SA) network. As a result, a UE may remain in an out-of-service state for a longer-than-necessary time, often resulting in poor user experience with the UE.

Aspects of the disclosure aid a UE in obtaining network service faster and reducing the amount of time the UE remains in an out-of-service state. In particular, aspects of the disclosure include a UE treating as a permanent failure a first detected failure instance of a SUCI calculation that is initiated as part of a first 5G (SA) service registration/authentication procedure. The 5G (SA) service registration/authentication procedure may be triggered by a UE to register the UE for service in the 5G (SA) network. In some aspects, the UE may remove the 5G (SA) RAT from the RAT priority list, or reduce the 5G (SA) RAT's associated priority ranking, to prevent further attempts to register the UE for service in the 5G (SA) network. In addition, the UE may immediately trigger a non-5G (SA) service registration procedure to register the UE for service in the non-5G (SA) network upon detecting the first failure instance of the SUCI calculation. According to some aspects, while registered and authenticated for service in the non-5G (SA) network, the UE may monitor a subscriber identification module (SIM) associated with the UE to determine if the SIM has been upgraded to allow for UE registration/authentication in a 5G (SA) network. In some aspects, upon determining that the SIM has been updated, the UE may add the 5G (SA) RAT back to the RAT priority list and trigger a second 5G (SA) service registration procedure to register the UE for service in the 5G (SA) network.

Figure 3:
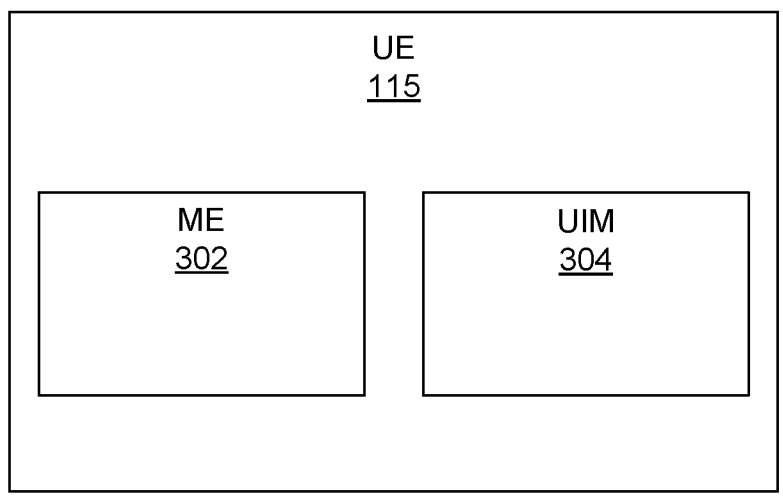
FIG. 3 is a block diagram conceptually illustrating a design of a UE configured according to some aspects of the present disclosure.

FIG. 3, as an example, shows a block diagram conceptually illustrating a design of a UE 115 configured according to some aspects of the present disclosure. As illustrated in FIG. 3, a UE 115 may include mobile equipment (ME) 302 and user identity module (UIM) 304. In some aspects, UIM 304 may be realized in hardware, software, and/or some combination of hardware and software. For example, UIM 304 may be a memory device with a built-in processor. According to some aspects, UIM 304 may include, for example, a SIM, trusted hardware module, a universal integrated circuit card (UICC), a universal subscriber identity module (USIM), a removable user identity module (R-UIM), etc. According to some aspects, UIM 304 may store information elements related to a user/subscriber. In some aspects, ME 302 may include the components/modules of UE 115 not included in UIM 304, such as the components/modules of UE 115 illustrated in FIG. 2.

A SUCI may be calculated by ME 302 or UIM 304. In some aspects, an indication may be included within UIM 304 to indicate whether the SUCI should be calculated by ME 302 or UIM 304. According to some aspects, quickly determining whether a SUCI can be successfully calculated by either the ME 302 or UIM 304 may enable a UE to obtain network service faster and reduce the amount of time the UE remains in an out-of-service state.

Figure 4:
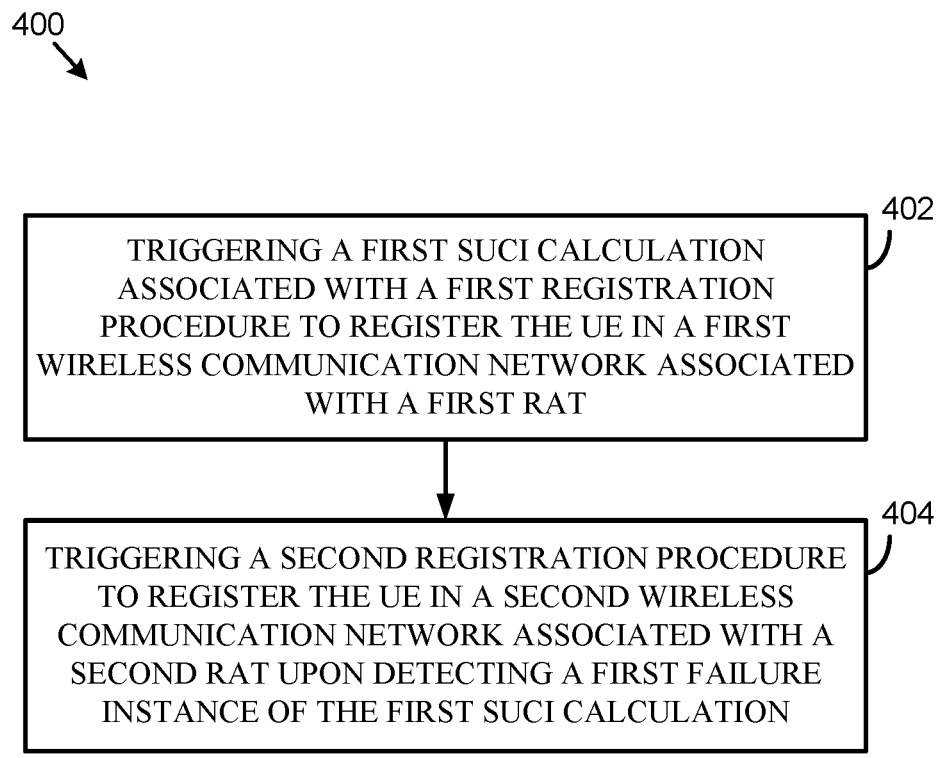
FIG. 4 is a block diagram illustrating a method for obtaining network service in a wireless communication system according to some aspects of the present disclosure.

FIG. 4, as an example, shows a block diagram illustrating a method for obtaining network service in a wireless communication system according to some aspects of the present disclosure. Aspects of method 400 may be implemented with various other aspects of this disclosure described with respect to FIGS. 1-3 and 5-6, such as a mobile device/UE.

For example, with reference to FIG. 2, controller/processor 280 of UE 115 may control UE 115 to perform method 400.

Figure 6:
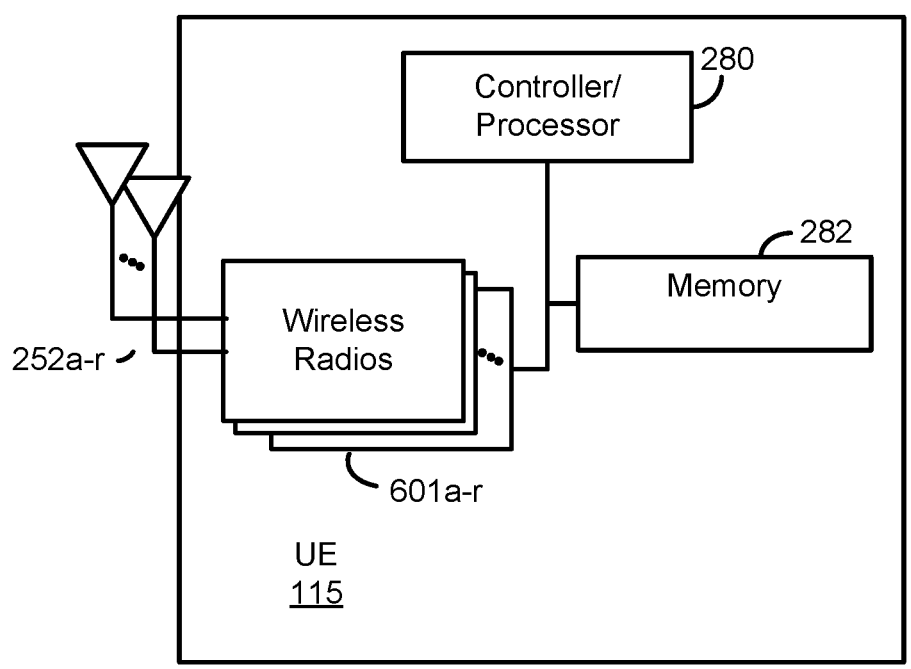
FIG. 6 is a block diagram conceptually illustrating a design of a UE configured according to some aspects of the present disclosure.

The example blocks of method 400 will also be described with respect to UE 115 as illustrated in FIG. 6. FIG. 6 is a block diagram illustrating UE 115 configured according to one aspect of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 601a-r and antennas 252a-r. Wireless radios 601a-r include various components and hardware, as illustrated in FIG. 2 for UE 115, including modulator/demodulators 254a-r, MIMO detector 256, receive processor 258, transmit processor 264, and TX MIMO processor 266. The controller/processor 280 can be provided with digital signals obtained from sampling received analog wireless signals for purposes of controlling communication operations.

FIG. 4 illustrates a method 400 that may be performed by a wireless communication device, such as a UE 115. Method 400 includes, at block 402, triggering, by a UE, a first SUCI calculation associated with a first service registration procedure to register the UE for service in a first wireless network associated with a first RAT. At block 404, method 400 includes triggering, by the UE, a second registration procedure to register the UE in a second wireless network associate with a second RAT upon detecting a first failure instance of the first SUCI calculation. The actions shown at blocks 402 and 404 of method 400 may be a subset of the overall operations performed by a UE to obtain network service. The relationship between the actions shown at blocks 402 and 404 of method 400 and other operations that are performed by a UE to obtain network service may become more evident from a discussion of the overall operations performed by a UE to obtain network service.

Figure 5A:
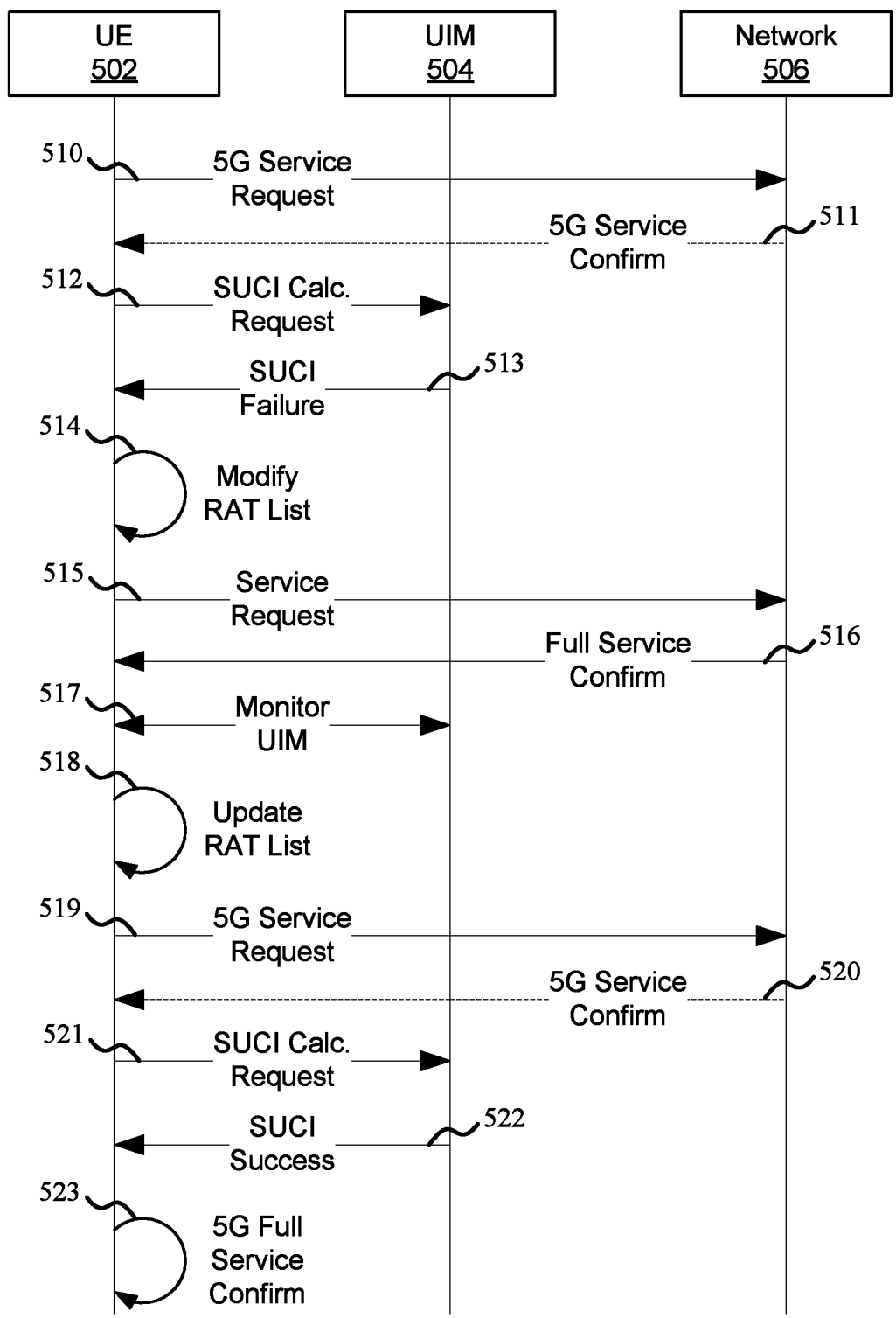
FIG. 5A is a diagram illustrating operations performed for a UE to obtain network service according to some aspects of the present disclosure.

FIG. 5A is a diagram illustrating operations performed for a UE to obtain network service according to some aspects of the present disclosure. FIG. 5A shows a UE 502, UIM 504, and network 506. As described above with respect to FIG. 3, the UIM 504 may be located within the UE 502 along with the ME of UE 502, such as ME 302. In some aspects of the disclosure, Network 506 may include network components, such as, for example, core network components and/or base station components, such as base station 105.

As illustrated in FIG. 5A, one of the operations that may be performed for a UE to obtain network service may include UE 502 sending a first 5G Service Request message 510 to network 506. In some aspects of the disclosure, the first 5G Service Request message 510 may be part of a first, i.e., initial, service registration/authentication procedure to register/authenticate the UE 502 for service, such as the first registration procedure mentioned at block 402 of method 400. For example, the first 5G Service Request message 510 may be part of a service registration/authentication procedure triggered when network services are needed by UE 502, such as when UE 502 wakes up, powers on, or exits an out-of-service mode, such as an airplane mode. In addition, the first 5G Service Request message 510 illustrated in FIG. 5A may be the first 5G Service Request message sent by UE 502 as part of the service registration/authentication procedure to register/authenticate the UE 502 for service when network service is needed. According to some aspects, a 5G Service Request message 510 may include a Call Manager (CM) Service Request message and/or a Radio Resource Control (RRC) Service Request message.

In some aspects, UE 502 may use a RAT priority list to determine the specific network UE 502 should register with for service. As previously mentioned, a RAT priority list may refer to a list that specifies an order or priority of RATs to use for wireless communication. In the aspect of the disclosure illustrated in FIG. 5A, the highest priority RAT in the RAT priority list used by UE 502 may be 5G (SA). As such, the first 5G Service Request message 510 may be part of a first service registration/authentication procedure to register/authenticate the UE 502 for service in a 5G (SA) network associated with a 5G (SA) RAT. Similarly, returning to FIG. 4, the first wireless communication network associated with the first RAT, as described at block 402 of method 400, may in some aspects of the disclosure refer to a 5G (SA) network associated with a 5G (SA) RAT. In some aspects of the disclosure, the RAT priority list may be stored within UE 502 (e.g., a memory disposed at or within the UE).

Network registration attempts as discussed herein can involve network communication aspects. For example, the network 506 may respond to a UE's 5G Service Request message 510 upon receipt. As one example, the network 506 can respond with a 5G Service Confirmation message 511. In some aspects, 5G Service Confirmation message 511 may indicate that an acquisition operation part of the service registration procedure was successful. Success generally indicates that a UE is able to register and connect with a network enabling subsequent quality communications.

UE attempts to register with a network may involve a number of actions. In some aspects, a UE's 502 processor may instruct that a first SUCI Calculation Request message 512 is to be sent to UIM 504. The first SUCI Calculation Request message 512 may be the first SUCI Calculation Request message 512 sent as part of the same service registration/authentication procedure that includes the 5G Service Request message 510. For example, as disclosed with reference to FIG. 4, a UE 502 may trigger a first SUCI calculation, such as through SUCI Calculation Request message 512, that is associated with the first service registration/authentication procedure to register/authenticate the UE 502 for service in a 5G (SA) network associated with a 5G (SA) RAT.

UIM 504 may receive and process the first SUCI Calculation Request message 512, and respond accordingly. Typically, if UIM 504 is able to calculate the SUCI, it will do so and then send the calculated SUCI back to UE 502. In the aspect of the disclosure illustrated in FIG. 5A, however, the UIM 504 is unable to calculate the SUCI. As a result, UE 502 may receive a first SUCI Failure indication 513 and/or detect a first SUCI Failure indication 513.

UE 502 may detect a first SUCI Failure indication 513 in one or more of various forms. For example, in some aspects, UE 502 may receive a message or other type of indication, such as a flag, an error code, or error indication, sent from UIM 504 that indicates that UIM 504 is not able to calculate, generate, and/or provide the requested SUCI. In other aspects, UE 502 may detect the first SUCI Failure indication 513 by detecting that the calculated SUCI provided by the UIM 504 is not valid.

In some aspects, the first SUCI Failure indication 513 may be the first failure instance of the requested first SUCI calculation, such as requested through the first SUCI Calculation Request message 512. For example, the first SUCI Failure indication 513 may be the first SUCI Failure indication 513 received and/or detected by UE 502. In other words, SUCI Failure indication 513 may be received and/or detected in response to the first SUCI Calculation Request message 512 sent as part of the same service registration/authentication procedure that includes the 5G Service Request message 510. In addition, UE 502 may not have received a valid calculated SUCI since sending the first SUCI Calculation Request message 512.

In some aspects, UE 502 may obtain and process a limited service confirmation message (not shown) indicating that registration of UE 502 with the 5G (SA) network/RAT was unsuccessful based, at least in part, on the detected first SUCI Failure indication 513. According to some aspects, the limited service confirmation message may be a message generated within UE 502 upon determining that the SUCI calculation from UIM 504 was unsuccessful, e.g., based on the detected first SUCI Failure indication 513.

UE 502 may perform various operations upon detecting the first SUCI calculation failure instance, e.g., the first SUCI Failure indication 513. In some aspects, UE 502 may perform a RAT priority list modification operation 514 to modify the RAT priority list upon detecting the first failure instance 513 of the first SUCI calculation. For example, the RAT priority list modification operation 514 may include the UE 502 removing the 5G (SA) RAT, e.g., the first RAT mentioned at block 402 of FIG. 4, from the RAT priority list upon detecting the first failure instance 513 of the first SUCI calculation. In additional aspects of the disclosure, the RAT priority list modification operation 514 may include the UE 502 adjusting the priority of the 5G (SA) RAT so that it is no longer the highest priority RAT in the RAT priority list. As an example, UE 502 may assign the 5G (SA) RAT the lowest rank or priority in the RAT priority list.

As mentioned at block 404 of method 400, UE 502 may also trigger a second registration procedure to register the UE 502 in a second wireless communication network associated with a second RAT upon detecting the first SUCI calculation failure instance, e.g., the first SUCI Failure indication 513. As an example illustration of the second registration procedure triggered upon detecting the first SUCI calculation failure instance 513, FIG. 5A shows the UE 502 sending a second Service Request message 515 to network 506. In some aspects, the second Service Request message 515 may be part of a second registration/authentication procedure to register/authenticate the UE 502 for service. According to some aspects, the second registration procedure may be different than the first registration procedure. In addition, the second wireless communication network associated with a second RAT may be different than the 5G (SA) network associated with the 5G (SA) RAT. According to some aspects, a Service Request message 515 may include a CM Service Request message and/or a RRC Service Request message.

In some aspects of the disclosure, UE 502 may use the modified RAT priority list to determine the specific second network UE 502 should now register with for service. In some aspects, the second RAT for the second registration procedure may be the highest priority RAT in the RAT priority list after the 5G (SA) RAT has been removed, lowered in priority, or lowered in rank through the RAT priority list modification operation 514. In other words, the second RAT may have been the next-highest priority RAT in the initial RAT priority list that initially listed 5G (SA) as the highest priority RAT. According to some aspects, the second RAT may be a 5G (NSA) RAT, a 4G/LTE RAT, or a non-5G RAT. As such, the second Service Request message 515 may be part of a second service registration/authentication procedure to register/authenticate the UE 502 for service in a second network, e.g., a 5G (NSA), 4G/LTE, or other non-5G network, associated with a second RAT, e.g., a 5G (NSA), 4G/LTE, or other non-5G RAT. In some aspects, to make sure the second registration procedure does not again attempt to register/authenticate with the 5G (SA) network after the first SUCI calculation failure instance 513, UE 502 may modify the RAT priority list before the second registration procedure is triggered.

The network 506 may respond to the Service Request message 515 with a Full Service Confirmation message 516. In some aspects, Full Service Confirmation message 516 may indicate that the second registration/authentication procedure was successful. In other words, Full Service Confirmation message 516 may indicate that UE 502 was successfully registered and authenticated for service with the second network, e.g., a 5G (NSA), 4G/LTE, or other non-5G network, associated with the second RAT, e.g., a 5G (NSA), 4G/LTE, or other non-5G RAT. As such, UE 502 may now be able to use the second network/RAT, for example to access data, perform a call, send a message, or perform any other operation on the second network/RAT.

In some aspects, the Full Service message 516 may be received irrespective of whether or not a SUCI calculation was successful. In other words, in some aspects, the second registration procedure may not include a SUCI calculation. Thus, Full Service message 516 may be received without a SUCI calculation having been requested or calculated as part of the second registration procedure.

In some aspects, after UE 502 has service with, and is operational within, the second network/RAT, UE 502 may perform a UIM monitoring operation 517 to monitor UIM 504. For example, UE 502 may monitor UIM 504 to determine when UE 502 may again try to register/authenticate with a 5G (SA) network associated with a 5G (SA) RAT, and thereby be able to use the improved 5G (SA) technology to achieve higher performance than can be achieved with the second network/RAT.

UE 502 may perform various operations as part of the UIM monitoring operation 517. For example, UE 502 may monitor, e.g., read, data within UIM 504, e.g., data within a SIM card of UIM 504, to detect a modification, e.g., an update, of the data. The updated data may indicate that UE 502 can register/authenticate with a 5G (SA) network associated with a 5G (SA) RAT. In other words, the updated data may allow UE 502 to be registered for service in a 5G (SA) network associated with a 5G (SA) RAT. In some aspects, a network operator may update data within UIM 504 using a Short Message Service (SMS) message. In additional aspects, a network operator may update data within UIM 504 using a Bearer Independent Protocol (BIP) message. In some aspects, instead of reading the data within UIM 504 to detect the modified/updated data, UE 502 may receive a message informing UE 502 that data within UIM 504 has been updated. Thus, in some aspects, UE 502 may detect the modified/updated data by monitoring or reading the data within UIM 504 or by receiving a message indicating that the data has been modified/updated. As mentioned above, UE 502 may perform UIM monitoring operations 517 after UE has service with, and is operational within, the second network/RAT. Accordingly, in some aspects, UE 502 may determine that UIM 504, or a SIM within UIM 504, associated with UE 502 has been updated while UE 502 is registered in the second wireless communication network.

UE 502 may perform various operations upon determining that UIM 504, or a SIM within UIM 504, associated with UE 502 has been modified/updated. For example, UE 502 may perform a RAT priority list update operation 518 to update the RAT priority list upon detecting the modified/ updated data. In some aspects, the RAT priority list update operation 518 may include the UE 502 adding the 5G (SA) RAT, e.g., the first RAT mentioned at block 402 of FIG. 4, back to the RAT priority list as the highest priority RAT so that the RAT priority list again includes the 5G (SA) RAT upon determining that UIM 504, or a SIM within UIM 504, has been modified/updated. In additional aspects of the disclosure, the RAT priority list update operation 518 may include the UE 502 updating the priority of the 5G (SA) RAT so that it is again the highest priority RAT in the RAT priority list. As an example, UE 502 may assign the 5G (SA) RAT the highest rank or priority in the RAT priority list.

UE 502 may also trigger a third registration procedure based on the determination that UIM 504 has been modified/ updated. For example, UE 502 may trigger a third registration/authentication procedure to register/authenticate the UE 502 in the first wireless communication network, e.g., the 5G (SA) network, associated with the first RAT, e.g., the 5G (SA) RAT, based, at least in part, on the determination that UIM 504, or a SIM within UIM 504, has been modified/ updated. As an example illustration of the triggered third registration procedure, FIG. 5A shows the UE 502 sending a second 5G Service Request message 519 to network 506. According to some aspects, the third registration procedure may be different than the first or second registration procedures. According to some aspects, a 5G Service Request message 519 may include a CM Service Request message and/or a RRC Service Request message.

In some aspects of the disclosure, UE 502 may use the updated RAT priority list, e.g., as updated when UE 502 performs the RAT priority list update operations 518, to determine the specific network UE 502 should attempt to register with for service using the third registration procedure. In the aspect of the disclosure illustrated in FIG. 5A, the highest priority RAT in the updated RAT priority list used by UE 502 may again be the 5G (SA) RAT after being updated by UE 502 when UE 502 performs the RAT priority list update operations 518. As such, the second 5G Service Request message 519 may be part of a third service registration/authentication procedure to again attempt to register/ authenticate the UE 502 for service in a 5G (SA) network associated with a 5G (SA) RAT.

The network 506 may respond to the second 5G Service Request message 519 with a second 5G Service Confirmation message 520. In some aspects, the second 5G Service Confirmation message 520 may indicate that an acquisition operation part of the service registration procedure was successful.

In some aspects, UE 502 may send a second SUCI Calculation Request message 521 to UIM 504. For example, UE 502 may trigger a second SUCI calculation, such as through second SUCI Calculation Request message 521, that is associated with the third service registration/authentication procedure to register/authenticate the UE 502 for service in a 5G (SA) network associated with a 5G (SA) RAT.

UIM 504 may receive and process the second SUCI Calculation Request message 521, and respond accordingly. For example, UIM 504 may calculate the requested SUCI and then send the calculated SUCI back to UE 502 as part of a SUCI Success message 522. In some aspects, UIM 504 may send the calculated SUCI back to UE 502 and that transmission may serve as the SUCI Success message 522. In additional aspects, the SUCI Success message 522 may be a different message not part of the transmission of the calculated SUCI from UIM 504 to UE 502.

In some aspects, UE 502 may perform 5G Full Service Confirmation operations 523 to confirm successful registration with the 5G (SA) network/RAT. For example, UE 502 may obtain and process a confirmation message indicating that UE 502 is registered in the first wireless communication network, e.g., the 5G (SA) network, associated with the first RAT, e.g., the 5G (SA) RAT, based, at least in part, on successful completion of the second SUCI calculation. According to some aspects, the confirmation message may be a message generated within UE 502 upon determining that the SUCI calculation from UIM 504 was a success, e.g., based on the SUCI Success message 522. In some aspects, the confirmation message may be an indication that the third registration/authentication procedure was successful. In other words, the confirmation message may indicate that UE 502 was successfully registered and authenticated for service with the 5G (SA) network associated with the 5G (SA) RAT. As such, UE 502 may now be able to use the 5G (SA) network/RAT, for example to access data, perform a call, send a message, or perform any other operation on the 5G (SA) network/RAT.

Figure 5B:
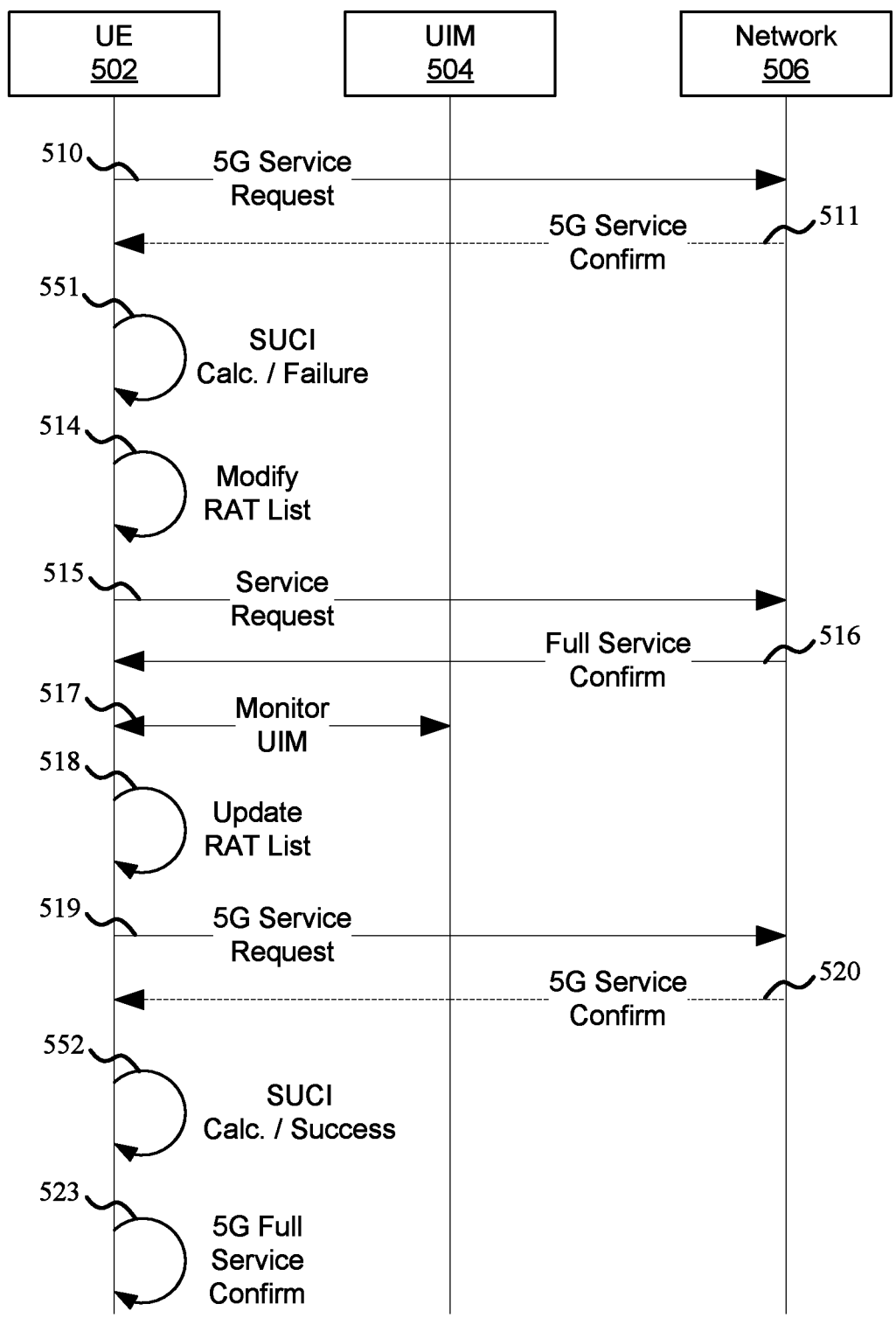
FIG. 5B is another diagram illustrating operations performed for a UE to obtain network service according to some aspects of the present disclosure.

FIG. 5B is another diagram illustrating operations performed for a UE to obtain network service according to some aspects of the present disclosure. The operations illustrated in FIG. 5B are the same as the operations illustrated in FIG. 5A with the exceptions that SUCI Calculation Request messages 512 and 521, first SUCI Failure indication 513, and SUCI Success message 522 are not present in FIG. 5B. In particular, FIG. 5A illustrates aspects of the disclosure in which UIM 504 performs the SUCI calculation. By contrast, in the aspects of the disclosure illustrated in FIG. 5B, the SUCI calculation is performed by ME of UE 502. Thus, in FIG. 5B, first SUCI Calculation and Failure operations 551 may replace both the first SUCI Calculation Request message 512 and the first SUCI Failure indication 513 illustrated in FIG. 5A. Similarly, second SUCI Calculation and Success operations 552 may replace both the second SUCI Calculation Request message 521 and the SUCI Success message 522 illustrated in FIG. 5A.

First SUCI Calculation and Failure operations 551 may include various operations performed by ME of UE 502. For example, in some aspects, rather than send a first SUCI Calculation Request message to trigger a required first SUCI calculation, ME of UE 502 may simply perform the first SUCI calculation without first a sending a first SUCI Calculation Request message. In some aspects, the SUCI Calculation performed by ME of UE 502 as part of the SUCI Calculation and Failure operations 551 may be the first SUCI Calculation performed as part of the same service registration/authentication procedure that includes the 5G Service Request message 510.

First SUCI Calculation and Failure operations 551 may also include operations performed by ME of UE 502 to detect a first SUCI Failure instance. In the aspect of the disclosure illustrated in FIG. 5B, the ME of UE 502 may be unable to calculate the first SUCI. As a result, UE 502 may detect a first SUCI Failure indication/instance. For example, UE 502 may detect the first SUCI Failure instance by detecting that the calculated SUCI is not valid. In additional aspects, UE 502 may detect the first SUCI Failure instance by determining that it is unable to calculate, generate, and/or provide the requested SUCI.

Similarly, second SUCI Calculation and Success operations 552 may include various operations performed by ME of UE 502. For example, in some aspects, rather than send a second SUCI Calculation Request message to trigger a required second SUCI calculation, ME of UE 502 may simply perform the second SUCI calculation without first a sending a second SUCI Calculation Request message.

Second SUCI Calculation and Success operations 552 may also include operations performed by ME of UE 502 to detect a successful SUCI calculation. In the aspect of the disclosure illustrated in FIG. 5B, the ME of UE 502 may be able to calculate the second SUCI. As a result, UE 502 may detect a SUCI Success indication/instance. For example, UE 502 may detect the SUCI Calculation Success instance by detecting that the calculated SUCI is valid. In additional aspects, UE 502 may detect the SUCI Calculation Success instance by determining that it is able to calculate, generate, and/or provide the requested SUCI.

In some aspects, network service discovery and selection techniques may include a UE triggering a first SUCI calculation associated with a first registration procedure. The first registration procedure may be used to register the UE in a first wireless communication network associated with a first RAT. Network service discovery and selection techniques may also include a UE triggering a second registration procedure to register the UE in a second wireless communication network associated with a second RAT upon detecting a first failure instance of the first SUCI calculation.

Network service discovery and selection techniques may include additional aspects, such as any single aspect or any combination of aspects described below and/or in connection with one or more other processes described elsewhere herein.

In a first aspect, a UE may remove the first RAT from a RAT priority list upon detecting the first failure instance of the first SUCI calculation.

In a second aspect, alone or in combination with the first aspect, the first RAT may be removed from the RAT priority list before the second registration procedure is triggered.

In a third aspect, alone or in combination with one or more of the first and second aspects, the second registration procedure may not include a SUCI calculation.

In a fourth aspect, alone or in combination with one or more of the first through third aspects, a UE may update the RAT priority list to again include the first RAT upon determining, while the UE is registered in the second wireless communication network, that a SIM associated with the UE has been updated.

In a fifth aspect, alone or in combination with one or more of the first through fourth aspects, a UE may trigger a second SUCI calculation associated with a third registration procedure to register the UE in the first wireless communication network associated with the first RAT included in the updated RAT priority list. The triggering of the second SUCI calculation may be based, at least in part, on the determination that the SIM has been updated.

In a sixth aspect, alone or in combination with one or more of the first through fifth aspects, a UE may process a confirmation message indicating that the UE is registered in the first wireless communication network associated with the first RAT based, at least in part, on successful completion of the second SUCI calculation.

In a seventh aspect, alone or in combination with one or more of the first through sixth aspects, the first RAT may be 5G (SA).

In an eighth aspect, alone or in combination with one or more of the first through seventh aspects, a UE may transmit a first registration message via a first RAT from the UE to a first wireless communication network. The first registration message may be associated with a SUCI.

In a ninth aspect, alone or in combination with one or more of the first through eighth aspects, a UE may transmit a second registration message via a second RAT from the UE to a second wireless network responsive to the SUCI.

In a tenth aspect, alone or in combination with one or more of the first through ninth aspects, a wireless communication system may include a UE that changes or switches registration with one or more networks and a wireless device configured for operation in said system.

In an eleventh aspect, alone or in combination with one or more of the first through tenth aspects, a wireless device may include a memory, a processor, and a transceiver. The transceiver may be configured to communicate with a plurality of RATs including a first RAT and a second RAT. The first RAT and the second RAT may be different types of communication networks.

In a twelfth aspect, alone or in combination with one or more of the first through eleventh aspects, a wireless device may include a memory, a processor, and a transceiver. The processor may be configured to instruct the transceiver to transmit one or more registration messages such that a UE can register with one or more RATs of a plurality of RATs.

In a thirteenth aspect, alone or in combination with one or more of the first through twelfth aspects, a wireless device may include a memory, a processor, and a transceiver. The processor may be configured to instruct the transceiver to transmit a first registration message via a first RAT from the UE to a first wireless communication network. The first registration message may be associated with a SUCI.

In a fourteenth aspect, alone or in combination with one or more of the first through thirteenth aspects, a wireless device may include a memory, a processor, and a transceiver. The processor may be configured to instruct the transceiver to transmit a second registration message via a second RAT from a UE to a second wireless network responsive to the SUCI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise a variety of components and structures. These may include one or more of processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof. These items can be utilized as one or more means for carrying out any one or more of the described functions and means discussed herein.

Those of skill would further appreciate that the various illustrative logical blocks, modules, circuits, and algorithm processing (e.g., the logical blocks in FIG. 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Features of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a user equipment (UE), comprising:
   triggering a first subscription concealed identifier (SUCI) calculation associated with a first registration procedure to register the UE in a first wireless communication network associated with a first radio access technology (RAT);
   detecting a first failure instance of the first SUCI calculation, wherein the first failure instance of the first SUCI calculation comprises a SUCI calculation failure detected first in time with respect to the triggering the first SUCI calculation;
   removing the first RAT from a RAT priority list upon the detecting the first failure instance of the first SUCI calculation; and
   triggering a second registration procedure to register the UE in a second wireless communication network associated with a second RAT upon the detecting the first failure instance of the first SUCI calculation, wherein the RAT priority list includes the second RAT.

2. The method of claim 1, wherein the first RAT is removed from the RAT priority list before the second registration procedure is triggered.

3. The method of claim 1, wherein the second registration procedure does not include a SUCI calculation.

4. The method of claim 1, further comprising:
   determining, while the UE is registered in the second wireless communication network, that a subscriber identification module (SIM) associated with the UE has been updated; and
   updating the RAT priority list to provide an updated RAT priority list including the first RAT upon the determining that the SIM associated with the UE has been updated.

5. The method of claim 4, further comprising:
   triggering a second SUCI calculation associated with a third registration procedure to register the UE in the first wireless communication network associated with the first RAT included in the updated RAT priority list based, at least in part, on the determining that the SIM associated with the UE has been updated; and processing a confirmation message indicating that the UE is registered in the first wireless communication network associated with the first RAT based, at least in part, on successful completion of the second SUCI calculation.

6. The method of claim 1, wherein the first RAT is fifth generation new radio (5G NR) standalone (SA).

7. An apparatus configured for wireless communication, comprising:
means for triggering a first subscription concealed identifier (SUCI) calculation associated with a first registration procedure to register the apparatus in a first wireless communication network associated with a first radio access technology (RAT);
means for detecting a first failure instance of the first SUCI calculation, wherein the first failure instance of the first SUCI calculation comprises a SUCI calculation failure detected first in time with respect to triggering the first SUCI calculation;
means for removing the first RAT from a RAT priority list upon detecting the first failure instance of the first SUCI calculation; and
means for triggering a second registration procedure to register the apparatus in a second wireless communication network associated with a second RAT upon detecting the first failure instance of the first SUCI calculation, wherein the RAT priority list includes the second RAT.

8. The apparatus of claim 7, wherein the first RAT is removed from the RAT priority list before the second registration procedure is triggered.

9. The apparatus of claim 7, wherein the second registration procedure does not include a SUCI calculation.

10. The apparatus of claim 7, further comprising:
means for determining, while the apparatus is registered in the second wireless communication network, that a subscriber identification module (SIM) associated with the apparatus has been updated; and
means for updating the RAT priority list to provide an updated RAT priority list including the first RAT upon determining that the SIM associated with the apparatus has been updated.

11. The apparatus of claim 10, further comprising:
means for triggering a second SUCI calculation associated with a third registration procedure to register the apparatus in the first wireless communication network associated with the first RAT included in the updated RAT priority list based, at least in part, on the determining that the SIM associated with the apparatus has been updated; and
means for processing a confirmation message indicating that the apparatus is registered in the first wireless communication network associated with the first RAT based, at least in part, on successful completion of the second SUCI calculation.

12. The apparatus of claim 7, wherein the first RAT is fifth generation new radio (5G NR) standalone (SA).

13. An apparatus configured for wireless communication, the apparatus comprising:
at least one processor; and
a memory comprising instructions,
wherein the at least one processor is configured to execute the instructions and cause the apparatus to:
trigger a first subscription concealed identifier (SUCI) calculation associated with a first registration procedure to register the apparatus in a first wireless communication network associated with a first radio access technology (RAT);
detect a first failure instance of the first SUCI calculation, wherein the first failure instance of the first SUCI calculation comprises a SUCI calculation failure detected first in time with respect to triggering the first SUCI calculation;
remove the first RAT from a RAT priority list upon detecting the first failure instance of the first SUCI calculation; and
trigger a second registration procedure to register the apparatus in a second wireless communication network associated with a second RAT upon detecting the first failure instance of the first SUCI calculation, wherein the RAT priority list includes the second RAT.

14. The apparatus of claim 13, wherein the first RAT is removed from the RAT priority list before the second registration procedure is triggered.

15. The apparatus of claim 13, wherein the second registration procedure does not include a SUCI calculation.

16. The apparatus of claim 13, wherein the at least one processor is further configured to cause the apparatus to:
determine, while the apparatus is registered in the second wireless communication network, that a subscriber identification module (SIM) associated with the apparatus has been updated; and
update the RAT priority list to provide an updated RAT priority list including the first RAT upon determining that the SIM associated with the apparatus has been updated.

17. The apparatus of claim 16, wherein the at least one processor is further configured to cause the apparatus to:
trigger a second SUCI calculation associated with a third registration procedure to register the apparatus in the first wireless communication network associated with the first RAT included in the updated RAT priority list based, at least in part, on the determining that the SIM associated with the apparatus has been updated; and
process a confirmation message indicating that the apparatus is registered in the first wireless communication network associated with the first RAT based, at least in part, on successful completion of the second SUCI calculation.

18. The apparatus of claim 13, wherein the first RAT is fifth generation new radio (5G NR) standalone (SA).

19. A user equipment (UE) comprising:
at least one processor;
a transceiver; and
a memory comprising instructions, wherein the at least one processor is configured to execute the instructions and cause the UE to:
transmit a first registration message, by the transceiver via a first radio access technology (RAT), from the UE to a first wireless communication network as part of a first registration procedure to register the UE in the first wireless communication network associated with the first RAT;
trigger a first subscription concealed identifier (SUCI) calculation associated with the first registration procedure to register the UE in the first wireless communication network associated with the first RAT;
detect a first failure instance of the first SUCI calculation, wherein the first failure instance of the first SUCI calculation comprises a SUCI calculation failure detected first in time with respect to triggering the first SUCI calculation;

remove the first RAT from a RAT priority list upon detecting the first failure instance of the first SUCI calculation; and transmit a second registration message, by the transceiver via a second RAT, from the UE to a second wireless communication network as part of a second registration procedure to register the UE in the second wireless communication network associated with the second RAT upon detecting the first failure instance of the first SUCI calculation, wherein the RAT priority list includes the second RAT.

20. The UE of claim 19, wherein the first RAT is removed from the RAT priority list before the second registration message is transmitted.

21. The UE of claim 19, wherein the second registration procedure does not include a SUCI calculation.

22. The UE of claim 19, wherein the at least one processor is further configured to cause the UE to:

determine, while the UE is registered in the second wireless communication network, that a subscriber identification module (SIM) associated with the UE has been updated; and update the RAT priority list to provide an updated RAT priority list including the first RAT upon determining that the SIM associated with the UE has been updated.

23. The UE of claim 22, wherein the at least one processor is further configured to cause the UE to:

trigger a second SUCI calculation associated with a third registration procedure to register the UE in the first wireless communication network associated with the first RAT included in the updated RAT priority list based, at least in part, on the determining that the SIM associated with the UE has been updated; and process a confirmation message indicating that the UE is registered in the first wireless communication network associated with the first RAT based, at least in part, on successful completion of the second SUCI calculation.

24. The UE of claim 19, wherein the first RAT is fifth generation new radio (5G NR) standalone (SA).

* * * * *